(12) United States Patent
Ankerfors et al.

(10) Patent No.: US 8,241,756 B2
(45) Date of Patent: Aug. 14, 2012

(54) COMPOSITION FOR COATING OF PRINTING PAPER

(75) Inventors: Mikael Ankerfors, Stockholm (SE); Tom Lindstrom, Sollentuna (SE); Hainong Song, Nanning (CN); Miroslav Hoc, Alvsjo (SE)

(73) Assignee: Innventia AB, Stockholm (SE)

( * ) Notice: Subject to any disclaimer, the term of this patent is extended or adjusted under 35 U.S.C. 154(b) by 0 days.

(21) Appl. No.: 12/935,922

(22) PCT Filed: Apr. 3, 2009

(86) PCT No.: PCT/SE2009/050355
§ 371 (c)(1),
(2), (4) Date: Dec. 3, 2010

(87) PCT Pub. No.: WO2009/123560
PCT Pub. Date: Oct. 8, 2009

(65) Prior Publication Data
US 2011/0081554 A1    Apr. 7, 2011

Related U.S. Application Data

(60) Provisional application No. 61/041,932, filed on Apr. 3, 2008.

(51) Int. Cl.
*D21H 11/16* (2006.01)

(52) U.S. Cl. ........ 428/532; 428/533; 428/534; 428/536; 428/537.5

(58) Field of Classification Search ................... 428/532, 428/533, 534, 536, 537.5
See application file for complete search history.

(56) References Cited

U.S. PATENT DOCUMENTS 6,183,596 B1 *   2/2001   Matsuda et al. .................. 162/9

FOREIGN PATENT DOCUMENTS

| EP | 0532193 | * | 3/1993 |
|---|---|---|---|
| EP | 0532193 A1 | | 3/1993 |
| EP | 0878324 A1 | | 11/1998 |
| JP | 58191296 | * | 11/1883 |
| JP | 58191296 A | | 11/1983 |
| SE | 0800807 L | | 10/2009 |
| WO | 2004055267 A1 | | 7/2004 |
| WO | WO2004/055267 | * | 7/2004 |
| WO | 2007091942 A1 | | 8/2007 |

OTHER PUBLICATIONS

International Search Report, dated Aug. 26, 2009, from corresponding PCT application.
Ankerfors, M. "The manufacture of microfibrillated cellulose (MFC) it applications" [online] Presentation at Nanostructures cellulose and new cellulose derivatives seminar, Nov. 14, 2006, Slides 1, 7-9 [Retrived on Jun. 23, 2009], Cited in International Search Report.
Syverud, K. et al. "Strength and barrier properties of MFC films" In: Cellulose, Feb. 2009, vol. 16, No. 1, pp. 75-85, ISSN: 0969-0239, p. 84, Cited in International Search Report.

* cited by examiner

*Primary Examiner* — Leszek Kiliman
(74) *Attorney, Agent, or Firm* — Young & Thompson

(57) ABSTRACT

The invention relates to compositions for coating of printing paper, said compositions comprising microfibrillated cellulose (MFC) and one or more polysaccharide hydrocolloids, and use of said compositions. Further, the invention relates to coated paper, comprising a first layer of polysaccharide hydrocolloid(s) and a second layer of MFC, and use of said paper. A method for reducing the linting and/or dusting of a paper is also disclosed.

18 Claims, 13 Drawing Sheets

COMPOSITION FOR COATING OF PRINTING PAPER

FIELD OF INVENTION

The current invention relates to compositions for reducing the linting and dusting tendency of printing paper during printing. Moreover, the invention relates to a coated paper, comprising such composition, and use thereof.

BACKGROUND

Linting and dusting are terms used to define the tendency of a paper surface to shed loose and weakly bonded particles and accumulate these on the blanket during offset printing.

Linting is a fibre, fibre fragment, ray cell or vessel element removal phenomenon related to both pulp and paper properties as well as printing conditions. Dusting is the result of loss of filler or other fine materials that are not firmly attached to the paper surface. When removed during printing, linting and dusting materials easily accumulate on the printing blanket, especially in the first printing unit when multiple printing units are used.

The mechanism of linting is not entirely understood and solving problems related to linting may be difficult processes. The mechanism of linting can generally be ascribed the inter-fibre bonding strength on the paper surface. That is to say, lint and dust are removed from the surface of the paper when the external forces exceed the forces holding the sheet together.

Picking is another aspect when it comes to the printability of paper. Picking stands for the pulling out of fibres or small clusters of fibres. Picking may in extreme cases result in sheet delamination, whereby large uniform areas are lifted from the paper surface. Picking occurs when the split resistance of the ink and hence the stress perpendicular to the paper surface exceeds the local strength of the paper surface at the outlet of the nip. Picking may result in linting.

Material removed from the paper surface consists mostly of poorly fibrillated fibres, non-fibrous cell materials (such as ray cells, vessels, bagasse pith etc) as well as fibre fragments, fines and debris. It is well-known that coarse and stiff fibres require a higher energy input during refining in order to minimize linting. The energy input hence is probably one of the more important parameters affecting linting.

Surface sizing is a known procedure for alleviating the linting tendency of newsprint. The linting problem cannot, however, be regarded solely as a papermaking problem. Printing press variables have a strong influence on paper linting performance and must by carefully controlled. Important press room factors include edition size, web lead configuration through the press (departure angle etc.), ink properties (viscosity and tack) and the fountain solution (quantity and quality). Linting can also be caused by an incorrect ink/water balance. From earlier studies, it can be concluded that several press variables often contribute to linting.

Linting results in deterioration of the print quality to the point where the press must by stopped and cleaned. This cleaning process is both tedious and costly. The linting tendency of paper can therefore have a strong effect on press-room efficiency, particularly in high volume printing operations such as newspaper production. The continued trend towards increased use of offset printing in high volume multi-colour printing operations has made linting a considerable economic problem and a source of frequent customer complaints. Consequently, there exists a need for improved sheets of paper with reduced linting and dusting propensity and additionally compositions for affecting said improvements.

SHORT DESCRIPTION OF THE INVENTION

In a first aspect of the current invention, there is provided a composition for coating of printing paper, said composition comprising microfibrillated cellulose (herein below referred to as MFC) and one or more polysaccharide hydrocolloid to reduce the linting and dusting propensity of said paper during printing. The polysaccharide hydrololloid may be any starch or gum. Gums that are suitably used in accordance with the current invention are exemplified by the group comprising locust bean gum, karaya gum, xanthan gum, gum arabic, gum ghatti, gum agar, pectin, gum targacanth, alginates, cellulose gums (e.g carboxymethyl cellulose, alkylcellulose, hydroxy-alkylcellulose, hydroxyethylcellulose, hydroxypropylcellulose), guar gum, tamarind gum, and carrageenan.

In one embodiment of the invention, the polysaccharide hydrocolloid is starch. The starch used may be any commercially available starch, comprising any combination of the two starch polymers amylase and amylopectin. The starch may be used in its native, in an anionic or cationic form. The starch may be modified using any of the following treatments; enzymes, thermo treatment, APS peroxide, etherification, esterification, oxidation (e.g. hypochlorite), acid hydrolysis, dextrinose, catioinization, hydroxyethylation, carboxymethylation, and acetylation. Additionally, other polysaccharide hydrocolloids selected from the group consisting of guar, tamarind, locust, karaya cellulose ether, xanthan, pectin, alginates, carrageenin, or agar may form part of the starch formulation binder.

The composition may consist exclusively of MFC and polysaccharide hydrocolloid(s), such as starch.

Exemplary plants from which starch may be obtained comprise potatoes, cassava, barley, wheat, corn, rice, tapioca, arrowroot, sago. Although a variety of different starches may be used, it will be recognized by those skilled in the art that differences in amylose content, branching, molecular weight and content of native lipid between various starch varieties will result in different chemical and physical properties and will thus influence the characteristics of the coating.

Processes for the manufacture of MFC are disclosed in e.g. WO2007/091942 and Swedish patent application SE 0800807-0.

Said microfibrillated cellulose (also commonly referred to as nanocellulose, nanofibrillated cellulose, nanofibres, microfibers) may be manufactured from any cellulose containing fibres, which may be found in chemical pulp, mechanical pulp, thermomechanical pulp, chemi(thermo)mechanical pulp (CMP or CTMP). The pulp used may consist of pulp from hardwood, softwood or a combination of both types of wood. The pulp may e.g. contain a mixture of pine and spruce or a mixture of birch and spruce. The chemical pulps that may be used in accordance with the present invention include all types of chemical wood-based pulps, such as bleached, half-bleached and unbleached sulphite, kraft and soda pulps, and mixtures or combinations of these.

The pulp may during manufacture of MFC be of any consistency, ranging from low consistency through medium consistency to high consistency. The fibre origin may be wood or any other cellulose containing plant. Normally, said fibres are treated in suspension with the aid of a mechanical comminution device, and said device may e.g. be a refiner, a fluidizer, a homogenizer or a microfluidizer. A pre-treatment of the fibres may also be performed prior to the treatment in said device.

Of the component parts of the composition, the polysaccharide hydrocolloid has a better ability than the MFC to penetrate the paper during coating, whereas the upper part of the coating to a greater extent consists of MFC. MFC as such has problems penetrating the paper, due to its high water retention capacity and particle size. Consequently, there exists a great synergistic effect of the composition disclosed.

The advantage of the composition of MFC and the polysaccharide hydrocolloid is three-fold: it offers a coating that holds the linting particles in place, partially anchors the particles internally in the sheet and anchors the MFC layer to the sheet.

The polysaccharide hydrocolloid used may be branched or unbranched, and may be native or modified, such as nonionic ethers, anionicilly modified or cationic.

When choosing the combination of MFC and polysaccharide hydrocolloid, attention is directed towards reducing the agglomeration propensity of the combination. This may be seen to by adjustment of the pH or salt content of the combination. Adjustment of said variables is well within the competence of the person skilled in the art.

One measure to reduce the agglomeration propensity is to ensure that the MFC and polysaccharide hydrocolloid used have substantially the same charge. For example, anionic MFC may be combined with anionic polysaccharide hydrocolloid to minimize agglomeration.

In one embodiment of the invention, the composition comprising MFC and the polysaccharide hydrocolloid comprises 1-90% by weight of MFC, with the balance comprising a polysaccharide hydrocolloid. In another embodiment of the invention, said composition comprises 2-50% by weight of MFC, with the balance comprising polysaccharide hydrocolloid. In yet an embodiment of the invention, the composition comprises 3-25% by weight of MFC, with the balance comprising polysaccharide hydrocolloid.

In another embodiment, the composition comprises 5-15% by weight of MFC, with the balance comprising the polysaccharide hydrocolloid.

% by weight is as used herein calculated based on the total weight of the respective composition or mixture, unless defined otherwise.

The compositions of the invention are suitable for both coating and surface sizing applications.

In one embodiment, there is provided a paper coated with the composition comprising MFC and the polysaccharide hydrocolloid. This paper has reduced linting propensity, while at the same time retaining acceptable ink absorbency. The ink absorbency may be in the same range as that of a conventional, uncoated paper.

In a second aspect of the invention, there is provided a coated paper, comprising a first layer of the polysaccharide hydrocolloid, and a second layer of MFC. The number of layers may be varied according to preferences. The polysaccharide hydrocolloid layer(s) form a foundation, to which the MFC is sufficiently bound. The polysaccharide hydrocolloid, enhances the interface between the MFC layer(s) and the paper surface. Thereby, the linting and dusting propensity of the final paper is reduced. MFC may be used to e.g. reinforce the surface characteristics of e.g. commercial newsprint sheet.

The polysaccharide hydrocolloid layer(s) of the coated paper in one embodiment comprises starch chosen from the group consisting of branched or unbranched native starch, anionic starch and cationic starch, peroxidized starch, etherified starch, esterified starch, oxidized starch, hydrolyzed starch, dextrinozed, starch hydroxyethylated starch, and acetylated starch, respectively. The starch used may be any commercially available starch, comprising any combination of the two starch polymers amylase and amylopectine.

In another embodiment of the invention, the polysaccharide hydrocolloid is chosen from the group consisting of locust bean gum, karaya gum, xanthan gum, gum arabic, gum ghatti, pectin, targacanth, alginates, cellulose gums, guar gum, tamarind gum.

In one embodiment, the coated paper has an amount of MFC in the region of 0.1-60 $g/m^2$ of the paper product. In another embodiment, the coated paper has an amount of MFC in the region of 0.5-40 $g/m^2$ of the paper. In yet an embodiment, the coated paper has an amount of MFC in the region of 1-30 $g/m^2$ of the paper. In still another embodiment, the coated paper has an amount of MFC in the region of 3-20 $g/m^2$ of the paper.

In a third aspect of the invention there is provided use of the composition comprising starch and MFC to provide a barrier on a paper.

In a fourth aspect of the invention, there is provided use of the paper coated with the composition comprising MFC and starch as a barrier.

In a fifth aspect of the invention, there is provided a method for reducing the linting and/or dusting of a paper, comprising coating of a paper with any composition as herein described.

"Paper" as used herein comprises any paper, sheet of paper and any other wood fibre based product.

The present invention will now be described with reference to the accompanying drawings. The embodiments and examples shall merely be seen as an illustration of the spirit and scope of the current invention, and in no way whatsoever as a limitation.

SHORT DESCRIPTION OF THE FIGURES

DETAILED DESCRIPTION OF THE INVENTION

Figure 1:
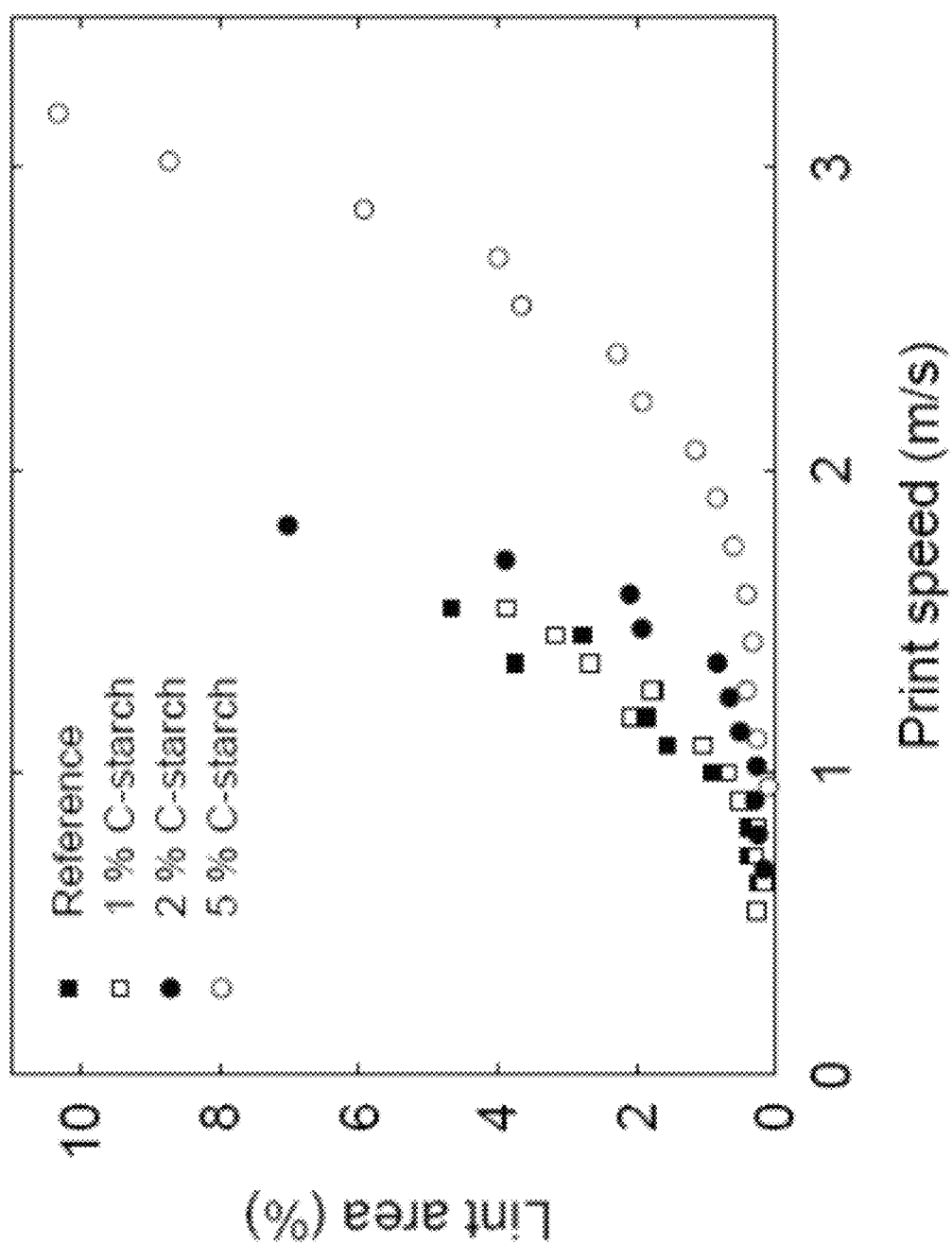
FIG. 1 shows the linting tendency of reference sheets with different amounts of C-starch for internal treatments.

Material
Pulp and Paper Materials

In the linting experiments, a never dried commercial spruce (*Picea abies*) thermo mechanical pulp (TMP) from Hallsta Paper mill (Holmen Paper, Sweden), was used. For preservation reasons, the pulp was frozen and thawn. After the pulp was thawned, the freeness in deionized water was 173 CSF (ISO 5267-2). Freeness measured at the mill was 102 CSF. In another set of linting experiments a commercial newsprint (improved newsprint, grammage=60 g/m2, Bendtsen surface roughness=150-230 ml/min) was used (Hallsta Paper mill, Holmen Paper, Sweden). In the manufacture of MFC, a commercial sulphite softwood-dissolving pulp (Domsjo Dissolving Plus; Domsjö Fabriker AB, Sweden), from 60% Norway spruce (*Picea abies*) and 40% Scottish Pine (*Pinus sylvestris*), with a hemicellulose content of 4.5% (measured as solubility in 18% NaOH) and a lignin content of 0.6% was used. The pulp was thoroughly washed with deionized water and used in its never-dried form.

Internal Treatment Chemicals
Cationic Starch (C-Starch)

For the internal treatments, a commercial potato C-starch was used (Amylofax PW, Degree of substitution (D.S.)=0.035, Avebe, The Netherlands). In order to gelatinise the C-starch, the C-starch was mixed with 200 mL deionized water to a concentration of around 1.5 wt-% and was heated to 90-95° C. and kept at this temperature for 15 minutes. After cooling, the solution was diluted to a volume of 1 L.

Anionic Polyacrylamide (A-PAM)

A-PAM (PL156, anionic charge density: 40 mole-%, Ciba, UK) was used as an adjuvant to retain C-starch (by complexation) at high C-starch dosages. In order to prepare an A-PAM solution, 0.125 g of A-PAM was soaked in 1.5 ml ethanol for 2 minutes. After an addition of 50 ml deionized water, the composition was mixed thoroughly for 2 minutes. Then the composition was stirred for 2 hours and left over night without stirring.

Surface Treatment Chemicals
Anionic Starch (A-Starch)

In the surface size treatments, an anionic oxidized potato starch (Perlcoat 158, charge density=153.2 µeq/g, Lyckeby Industrial AB, Sweden) was employed. In order to gelatinise the A-starch, the A-starch was mixed with deionized water to a concentration of around 10 wt-% and was then heated to 95° C. and kept at this temperature for 15 minutes. The pH was adjusted to pH 8 prior to the sizing experiments.

Micro Fibrillated Cellulose (MFC)

The dissolving softwood-pulp was first carboxymethylated to a D.S. of approximately 0.1 following a method described elsewhere (Wågberg, L., Decher, G., Norgren, M. Lindström, T., Ankerfors, M., and Axnäs, K. Langmuir (2008), 24(3), 784-795). Thereafter, the pulp was made into a an MFC by passing the carboxymethylated pulp at a concentration of 2 wt-% once through a high-pressure homogenizer (Microfluidizer M-110EH, Microfluidics Corp., USA) equipped with two differently sized chambers (diameter of 200 µm and 100 µm connected in series) with 170 MPa as the operating pressure. The formed MFC, which was a highly viscous gel, was diluted with deionized water to 0.56 wt-%, and was then dispersed with one pass through the high-pressure homogeniser in the same way as before.

MFC/A-Starch Formulations

Based on the concentrations of MFC and A-starch, blends of MFC and A-starch (50%:50%, mass ratio) were prepared in the following way: A composition of MFC and A-starch was passed once through a high-pressure homogenizer (Microfluidizer M-110EH, Microfluidics Corp., USA) equipped with two differently sized chambers (diameter of 200 µm and 100 µm connected in series) with 170 MPa operating pressure. After that, the composition was treated using an ultrasonic bath (Bransonic Ultrasonic Cleaner 5510E-MT, Bransonic Ultrasonics Corp., USA) for 10 minutes and was then placed on a vibrating table for 40 minutes to remove the entrapped air bubbles in the gel.

Methods
Hand-Sheets and Internal Treatments

The freeze dried TMP pulp was, thawn and hot-disintegrated at 85-95° C. at 1200 rpm for 10 minutes in order to reduce the latency of the pulp. For the internal treatments, the pulp was treated with 1, 2 and 5% C-starch for 10 minutes before sheet-forming. When 5% C-starch was used 0.1% A-PAM was used as an adjuvant (complexing agent) to secure an almost quantitative C-Starch deposition onto the TMP-furnish. In this case the A-PAM was added 10 sec after the C-starch and then left 10 minutes before sheet-forming. Tap water was used and the pH was set to pH=8 Sheets with a basis weight of 100±2 g/m² were made in the Formette Dynamique Sheet former (CTP, Grenoble, France) (Sauret et al. 1969). The sheets were pressed together with blotters at 8.1 kg/cm² for 5.5 minutes, then the blotters were replaced with new ones and the sheet was pressed at the same pressure for 2 minutes more. The drying of the sheets was performed against a hot gloss Photo-dryer.

Surface Treatments

The surface sizing was done with a bench coater (KCC coater M202, RK Print-coat Instruments Ltd., UK) equipped with wire-wound rods. Sizing was performed at a speed of the moving rod of approx. 5 m/min. The surface sizing operation was performed on the top side only on the Formette Dynamique sheets and along the MD direction.

The sheets were pre-dried at room temperature until the tackiness disappeared and finally dried against a hot gloss Photo-dryer. All surface sized sheets were dried for the same time. Repeated and parallel surface sizing operations were carried out. The basis weight of the paper was 100 g/m², while the coat weight was varied up to 5 g/m². The following chemicals were surface sized: A-starch, MFC and 50/50 weight-% A-starch/MFC composition. In the experiments, at least 3 different surface sizing levels were used. All samples, including blank or reference sheets making, sheets by internal treatments and sheets by surface treatments, were prepared according to the matrix shown in Table 1.

TABLE 1

Experimental matrix

| Coating Chemical | TMP (without any chemicals) | TMP (1% C-starch + 0.1% A-PAM) | TMP (2% C-starch + 0.1% A-PAM) | TMP (5% C-starch + 0.1% A-PAM) |
|---|---|---|---|---|
| Reference | * | * | * | * |
| A-starch | * | * | * | * |
| MFC | * | * | * | * |
| A-starch + MFC | * | * | * | * |

Calendaring
Pre-Calendaring

All sheets were pre-calendered in a soft nip laboratory calender (DT Laboratory Calender, DT Paper Science Oy, Finland), under a line pressure of 16 kN/m at a roll temperature of 22° C. for one time. Thereafter, the sheets were calendered twice on each side of the sheets, which gave a Bendtsen surface roughness around 200±50 ml/min (see below). This is a normal value for commercial newsprint sheets.

Post-Calendaring

The surface sized sheets were also calendered after the surface sizing treatment. Firstly, the surface sized sheets were conditioned according to the standard method SCAN-P 2:75 (Scandinavian Pulp, Paper and Board Testing Committee) for at least 48 hours. The sheets were then calendered once in the soft nip laboratory calender under a line pressure of 12 kN/m at a roll temperature of 22° C. before further surface analysis and printing tests were performed.

Analysis

Grammage and Surface Roughness

Grammage and weight of coating layer was determined according to standard method SCAN-P 6:75 (Scandinavian Pulp, Paper and Board Testing Committee). The Bendtsen method (ISO 8791-2) was used for the determination and control of surface roughness.

Linting tendency-Lint Pick Test

In this method, developed at STFI-Packforsk AB, Sweden, a paper sample is placed on an IGT-printability tester and the steel disc, made sticky with a thin film of pick-test oil is pressed against the paper. A print is then made at an accelerating speed. The disc is then photographed with a CCD-camera in a stereomicroscope. The disc is divided into 20 segments, which correspond to each photo taken by the camera. Since the acceleration is not linear, the four first and the two last segments on the disc were left out of the analysis. Hence, the measurements are performed on segments 5-18. The photos from these segments are analyzed and the amount of particles present (particles that have been removed from the surface of the sheets) is counted (particles/cm$^2$). The result is a number of particles, which have been shed from the surface at a specific speed. The particle counting was performed using an image analysis software (Linting Large Part, STFI-Packforsk AB, Sweden). This software distinguishes between four different groups of particles in the images: fibres, clusters, particles and small particles. The criteria for the groups are:

Fibre: The object's circumference is >2 mm and its rectangularity is <0.3 i.e. the object is long.
Cluster: The object's area is >0.3 mm2 or its circumference is >2 mm and its rectangularity is >0.3.
Particle: The object's area is 0.02-0.3 mm2.
Small particle: If none of the above, the object is a small particle.

The LPT-measurements in this work were based on the IGT pick resistance method (ISO 3783) using an IGT-printability tester (IGT AIC 2-5, Reprotest b.v., The Netherlands). The steel disc was made sticky using 13.7±1.1 mg of pick-test oil (IGT Pick Test Oil (404.004.020) middle viscosity, Paper Test Equipment, Sweden).

Instead of detecting the start of the pick on the test strip, the particles picked up on the print disc were detected using a CCD-camera (Model ICD 700, Ikegami, Japan, used resolution=15 μm/pixel) connected to a stereomicroscope (Model SZ-CTV, Olympus Sverige AB, Sweden). The maximum print speed measured was 5.0 m/s.

The Fibre Rising Tester is a method developed by STFI-Packforsk in the beginning of the 1990's (Hoc 2005). Fibre rising tendency (FRT) is defined as the amount and the size of fibres that rises from the paper surface when the paper is wetted, dried and then transported over a thin roll. This method gives information of how the bonds between the surface fibres can resist wet induced fibre rising. It is also possible to measure the dry dusting by just turning the wetting procedure off. The principle is that a paper sample is wetted with a certain amount of water and is then dried with IR-heating element. The amount of fibre rising and roughness is continuously registered by a CCD-camera as the sample is being bent over a thin roll.

Dampening Drying Recording Image Analysis

When the paper is exposed to moisture and heat, different types of structural changes may occur on the surface. The FRT evaluates the sample based on two types of changes, referred to as Long Fibre Rising and Short Fibre Rising. Long fibres are bonded only at one end and extend more than 0.1 mm above the surface, while the short fibres are bonded along most of their length and extend no more than 0.1 mm above the surface. It is the long fibres that can cause linting problems due to their relatively long free ends and they are expressed as total length in millimetres.

Changes in the surface structure appear when the fibre network of the paper in the surface comes into contact with water and heat. These changes give rise to two separate effects, roughening and fibre rising. Both these effects can be described by the measurement of four parameters:

LRC (Long Rising Component) is a parameter, which describes the extent of the fibre rising as the total measured length of all fibres which rise from the paper surface after the surface treatment.
SRA (Short Rising Area) is a parameter, which describes the increase in surface roughness (roughening) as the measurement of the total area of all the particles which have been lifted from the paper surface but cannot be identified as fibres since the height of each of these particles is less than 0.1 mm.
TRA (Total Rising Area) is a parameter, which is defined as the total area of all the raised fibres including the area of all the particles which have been lifted from the paper surface but which are not fibres.
Q (Fibre Quantity) is the number of identified fibres, i.e. the particles whose length is greater than 0.1 mm. In this work, the samples were cut in 4.0 cm wide and at least 10 cm long strips. Ordinary copy paper was taped to the ends of the strips to make the test more material efficient (the FRT needed a longer sample than the area it actually needed for performing the test). The sample was placed in the FRT (FIBRO 1000, Fibro system AB, Sweden) and tested in the machine direction (MD). The sample was wetted with 6.0 g/m$^2$ of water. After that the paper was dried using IR-heating element until the paper surface had a temperature of 110° C. The sample was then transported over the thin roller and a CCD-camera registered rising fibres and roughness. In total 100 images were analysed by the equipment. Three specimens per sheet sample were measured.

Oil Absorbency

To estimate the ink absorbency for sheets, contact angle measurements were performed using a Dynamic Angle Tester (DAT 1100, Fibro system AB, Sweden). The measurements were performed by dropping a drop of castor oil (Castor oil USP, density=0.96 g/cm$^3$, Sigma-Aldrich Inc., USA) on the top side of the sheets. The initial drop volume was 7.0 μL and the change in drop volume over time (time span 0-12 s), drop base diameter and contact angle was measured. For each sheet sample, 8 parallel paper strips were measured (8 drops/paper strip) to get an average value.

Environmental Scanning Electron Microscope-Field Emission Gun (ESEM-FEG)

ESEM micrographs of sheet surfaces and cross-sections were taken to study the surface morphology and the layer structure of the sheets. The ESEM-micrographs were captured using ESEM model XL30 ESEM-FEG (Environmental Scanning Electron Microscope-Field Emission Gun) from Philips, The Netherlands. The working conditions were as follows: accelerating voltage=10 kV, WD=9 mm (working distance), low vacuum mode with BSE detector (backscattered electrons), and pressure in sample chamber=0.1 kPa. ESEM micrographs of the paper surfaces were also taken in high vacuum mode using SE detector (Secondary Electrons) at the same accelerating voltage 10 kV. WD was somewhat shorter ca 8.5 mm. For high vacuum mode the sheet surfaces were coated with a thin conducting layer of gold to prevent charging. ESEM micrographs of the cross-sections, giving z-direction information about the sheet structure, were obtained from the embedded papers. The paper samples were embedded in epoxy resin Spurr, grounded and then polished to obtain a smooth surface.

Results
Linting Tendency Analysis

Compared with the conventional IGT pick resistance method, according to which the start of the pick on the test strip is recorded, the particles picked up on the print disc were evaluated with image analysis regarding the area coverage, number and size classification in the STFI-LPT method. Furthermore, LPT describes the tendency of a paper to shed particles as a function of printing speed. Hence, the results of the LPT are believed to be a good quantification of the linting tendency. To simplify the analysis result, the area coverage of particles picked up in the LPT-results as a function of print speed is discussed in the following.

Linting Tendency of the Sheets with Internal Sizing Treatments

The TMP sheets were made with a reference sheet and with the addition of C-starch (1%, 2% and 5% C-starch+0.1% A-PAM) to the wet stock. A-PAM was used as a co-additive in order to retain the non-adsorbed extraneous C-starch at the highest addition level. Basically, the retention of C-starch to the fibres was quantitative. The LPT results from these internally sized sheets are displayed in FIG. 1. It was clearly observed that, at the same linting tendency, the print speed could be increased with the addition of C-starch. In other words, the surface strength of the sheets was increased by the addition of C-starch. An excess of more than 1% C-starch was, however, necessary in order to significantly improve the linting tendency of the TMP sheets.

Linting Tendency of the Sheets with Different Surface Treatments

Figure 2:
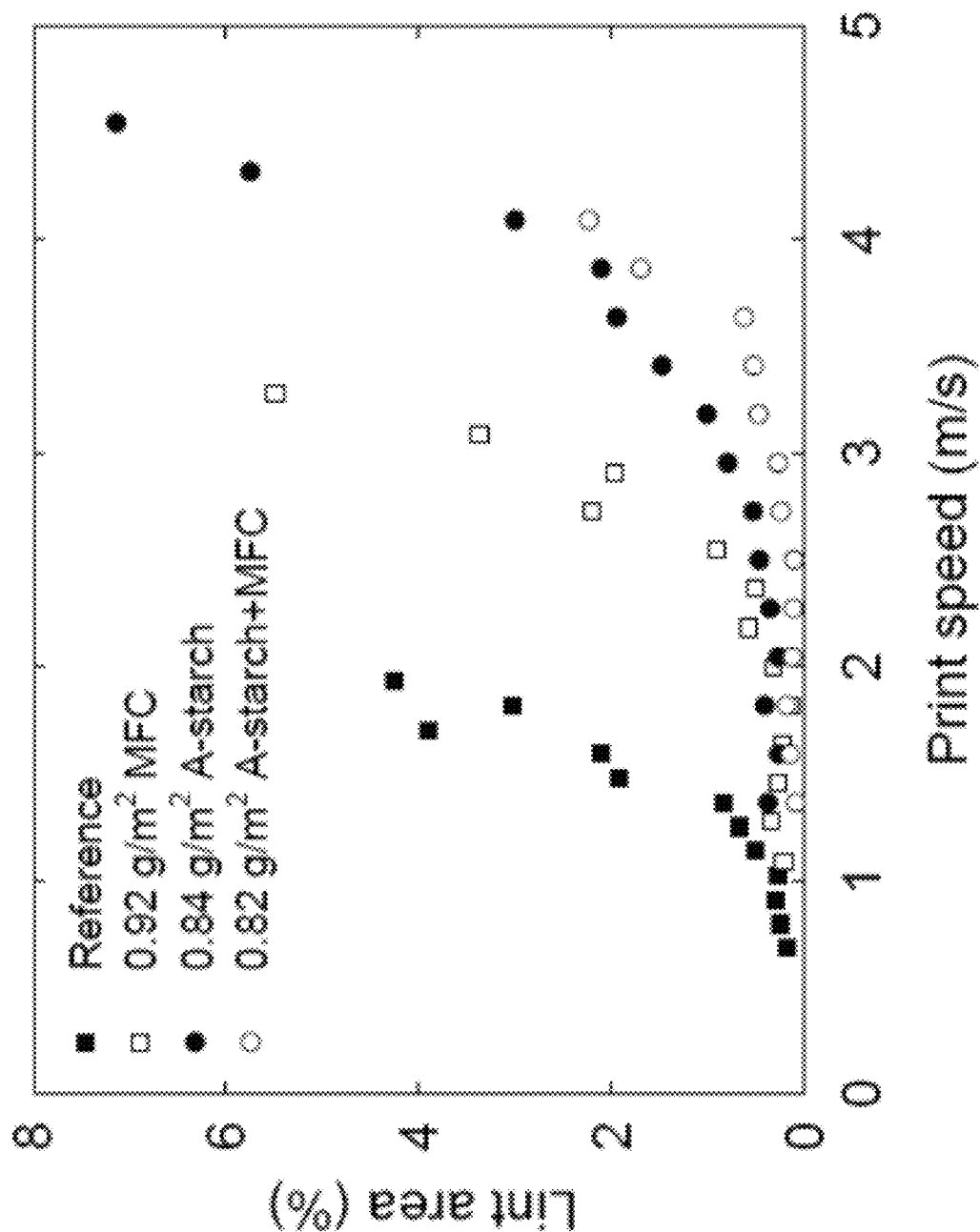
FIG. 2 shows the linting tendency of sheets (with 2% C-starch, internal treatment) which were surface treated using different chemicals at similar coating levels.

In FIG. 2, a reference sheet (internally sized with 2% C-starch) was surface sized with A-starch, MFC, and a mixture of MFC with A-starch (50%:50%, mass ratio), respectively, at a similar addition level. From FIG. 2 it is clear that both surface sizing with A-starch and MFC effectively reduces the linting tendency of the sheets. Secondly, there is also shown that there is a synergistic effect of adding both MFC and A-starch to the surface of the papers.

Figure 3:
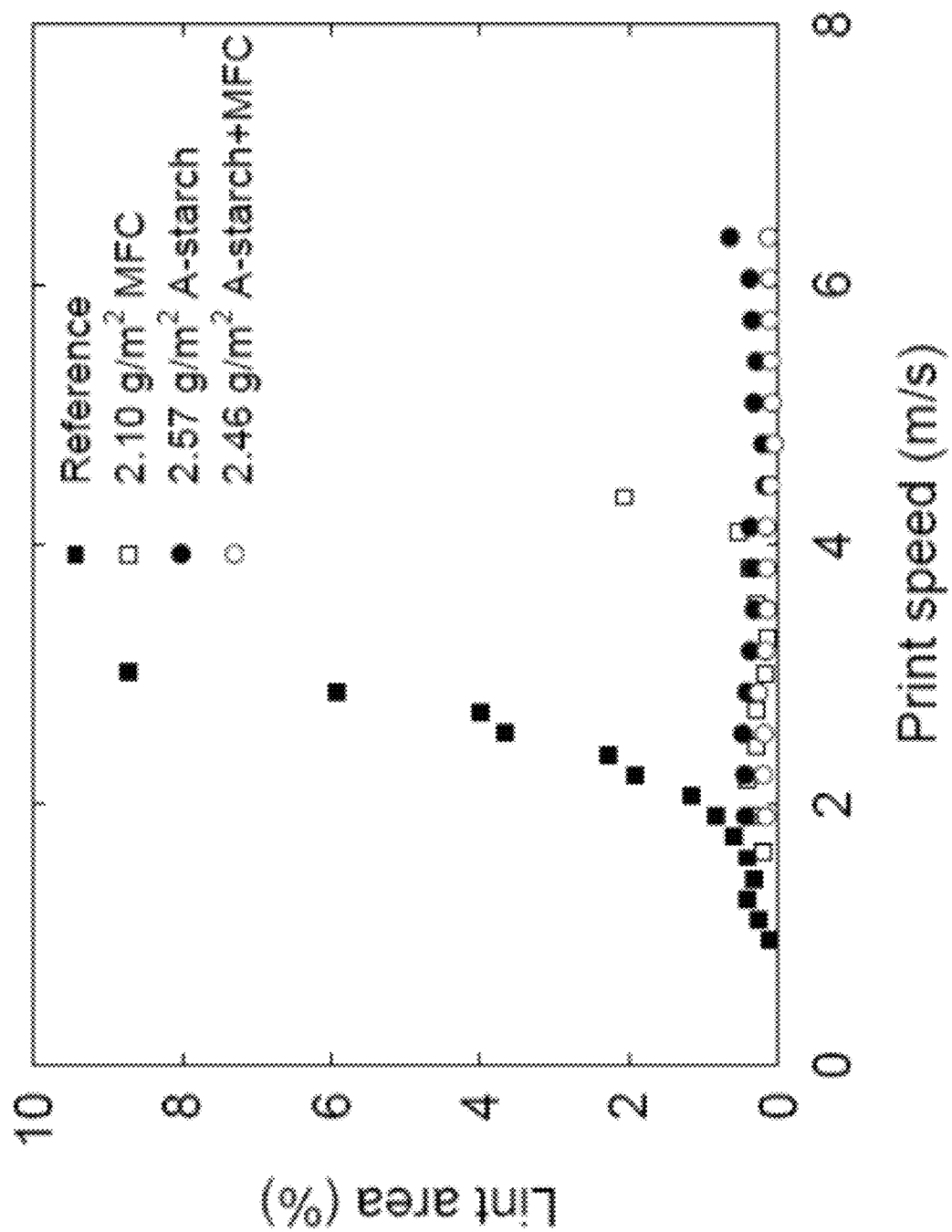
FIG. 3 shows the linting tendency of sheet (with 5% C-starch, internal treatment) which were surface treated using different chemicals at similar coating levels.
Figure 4:
FIG. 4 shows images on the print disc at end of the print speed=3.18 m/s, whereby the reference sheets were treated without any surface chemical.

FIG. 3 displays a similar series of experiments, where a reference sheet (internal sized with 5% C-starch) was surface sized using A-starch, MFC, and a mixture of MFC with A-starch (50%:50%, mass ratio) at similar addition levels. In this series of experiments an important observation was made. Despite the covering of the paper surface with a continuous MFC film, the sheet coated using MFC was easily delaminated when exceeding a certain critical printing speed. When the print disc was examined (see FIGS. 7 and 8) it was observed that the print disc was cleaner prior to delamination and that when the sheet was delaminated chunks of debris (film plus debris) was found. The MFC has a very high water retention capacity, hence it will not penetrate the sheet and a weak zone is formed at the interface between the MFC-film and the paper surface. This explains the synergistic role of using MFC and A-starch together. The A-starch will simply enhance the interface between the MFC-film and the paper surface, strongly decreasing the linting propensity of the sheet.

Figure 6:
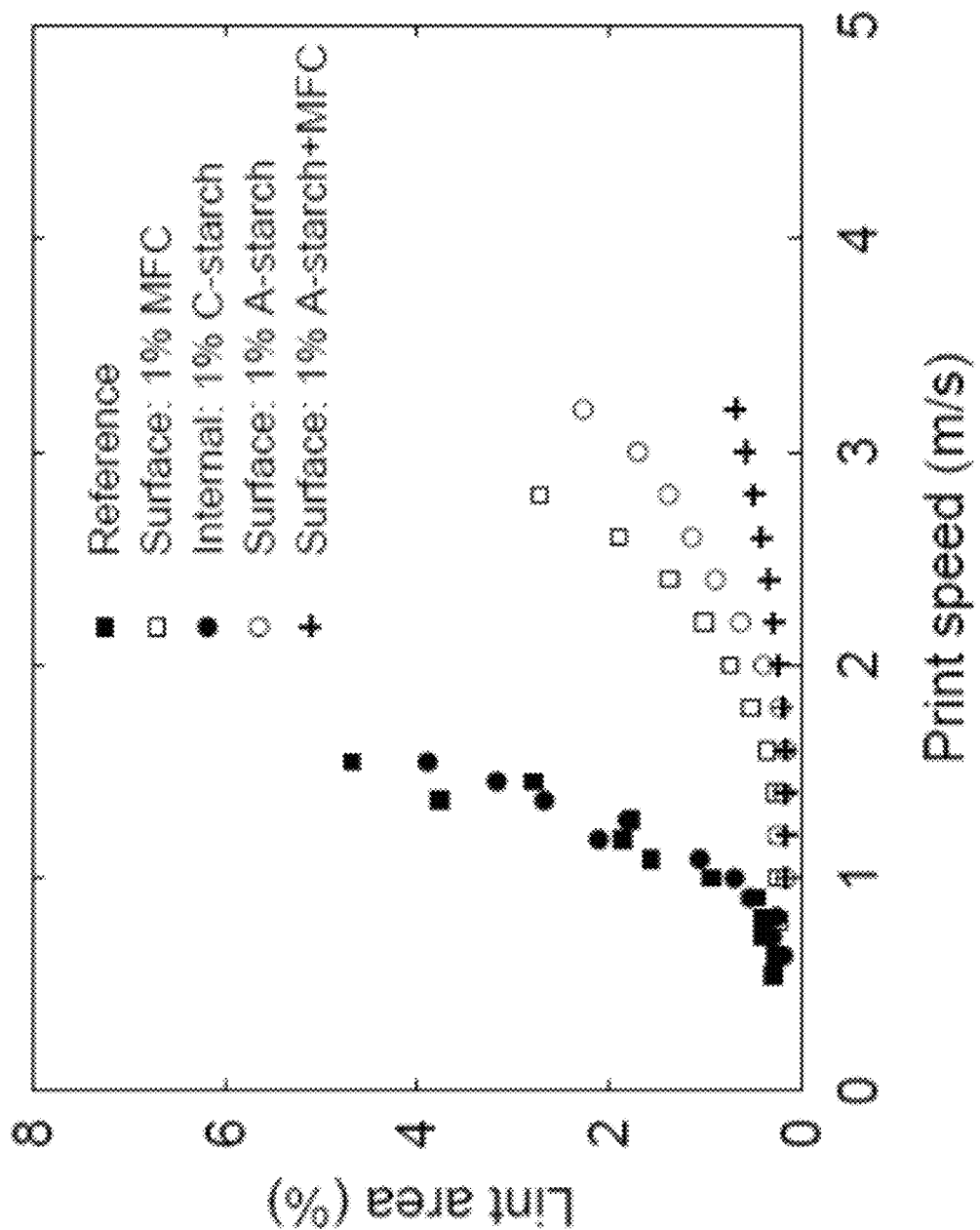
FIG. 6 shows the linting propensity of blank sheets with different chemical treatments at the same addition level (1%).
Figure 7:
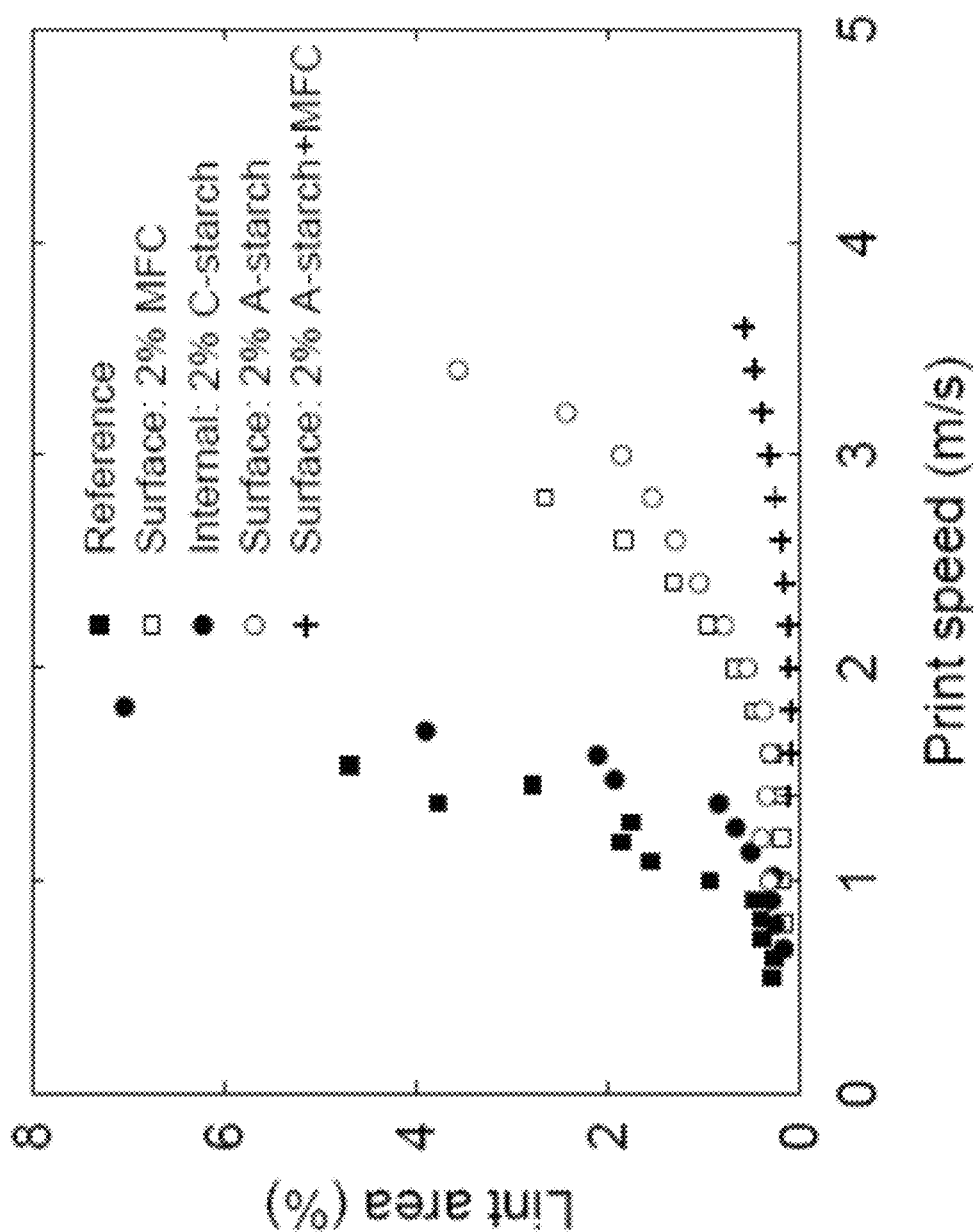
FIG. 7 shows the linting propensity of blank sheets with different chemical treatments at the same addition level (2%).
Figure 8:
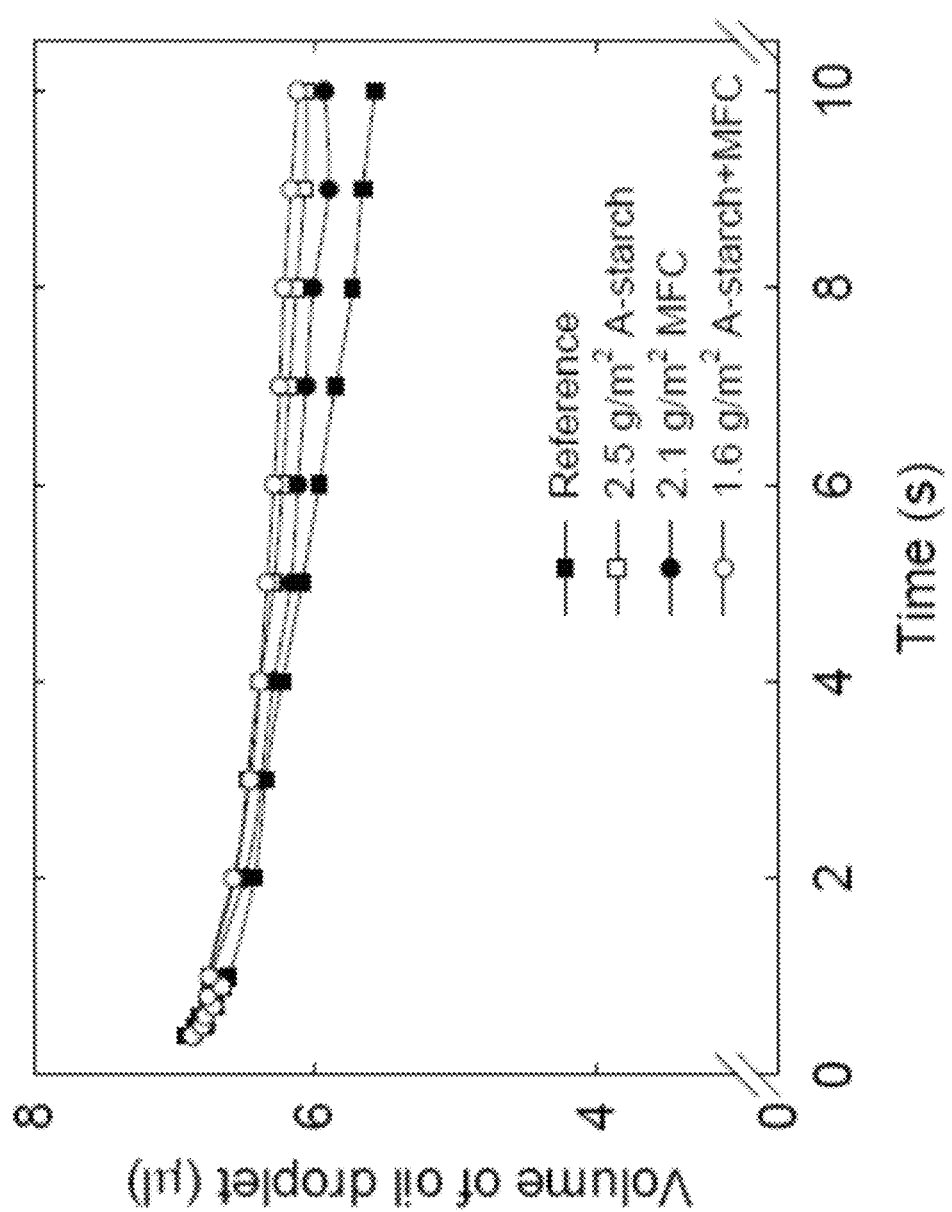
FIG. 8 shows oil drop volume vs. time, whereby different chemical treatments have been performed.
Figure 9:
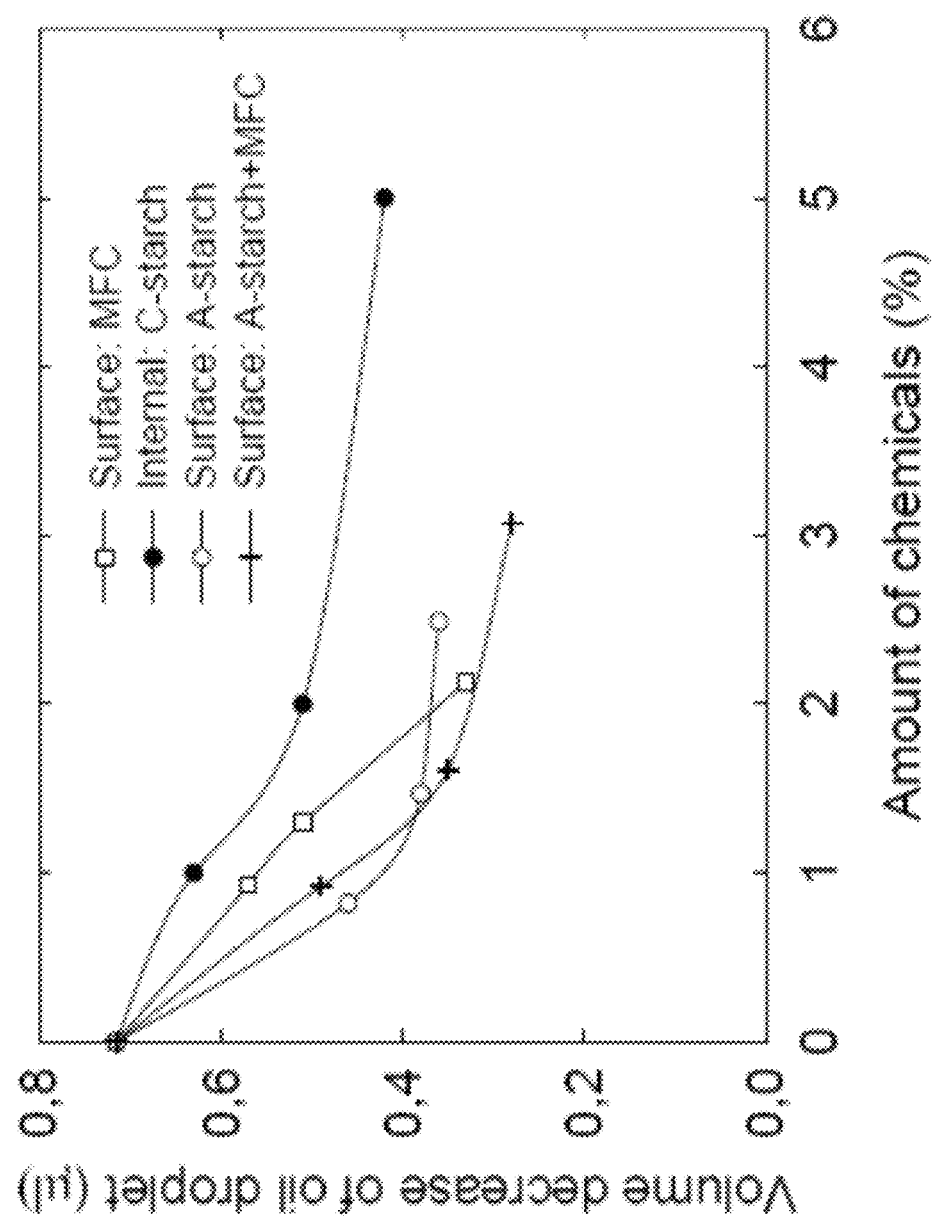
FIG. 9 shows oil absorbency (displayed as volume decrease of oil droplet between 1 and 5 s of contact time) of sheets with different chemical treatments.

Several series of experiments with different levels of internal and surface sizing additions using MFC, A-starch and C-starch using TMP were then exercised. In order to correct for slightly different addition levels in the various experiments a software (DataFit 7.0) was used to calculate the interpolated values at the addition levels of 1, 2 and 5%. The results so obtained are displayed in FIGS. 9, 10 and 11. Hence, FIG. 6 displays the effects of 1% internal C-starch addition and 1% surface addition of MFC, A-starch and a mixture of MFC/A-starch (50/50%). The effect of the internal addition of C-starch was again small, whereas both A-starch and MFC gave significant reductions in linting tendency. The synergism of adding a mixture of A-starch and MFC was again clear. FIG. 7 displays the results with an addition of 2% and the results are essentially similar to those in FIG. 8, but the surface strength of the sheets are, of course, stronger.

The Effects of Internal and Surface Sizing on Oil Absorbency of TMP-Sheets

A surface treatment of a newsprint sheet may jeopardize the ink absorbency of the sheet, resulting in ink set off and slow drying of the ink. Therefore, treated sheets were tested with respect to the oil absorbency after internal or surface sizing treatments. In the oil absorbency test the volume of an oil drop on the surface of a paper sheet is recorded versus time and typical results are displayed in FIG. 8. The data were also displayed as a decrease of the oil drop vs. time as displayed in FIG. 9. Both an internal sizing treatment and a surface treatment results in a slightly lower oil absorption. Surface treatments results in a barrier type retarded absorption, whereas an internal treatment results in a more consolidated sheet resulting in retardation of the oil absorbency. However, in comparison with the blank sheet, the decreasing tendency of oil absorption is limited.

Application Test on a Commercial Newsprint Sheet

Figure 10:
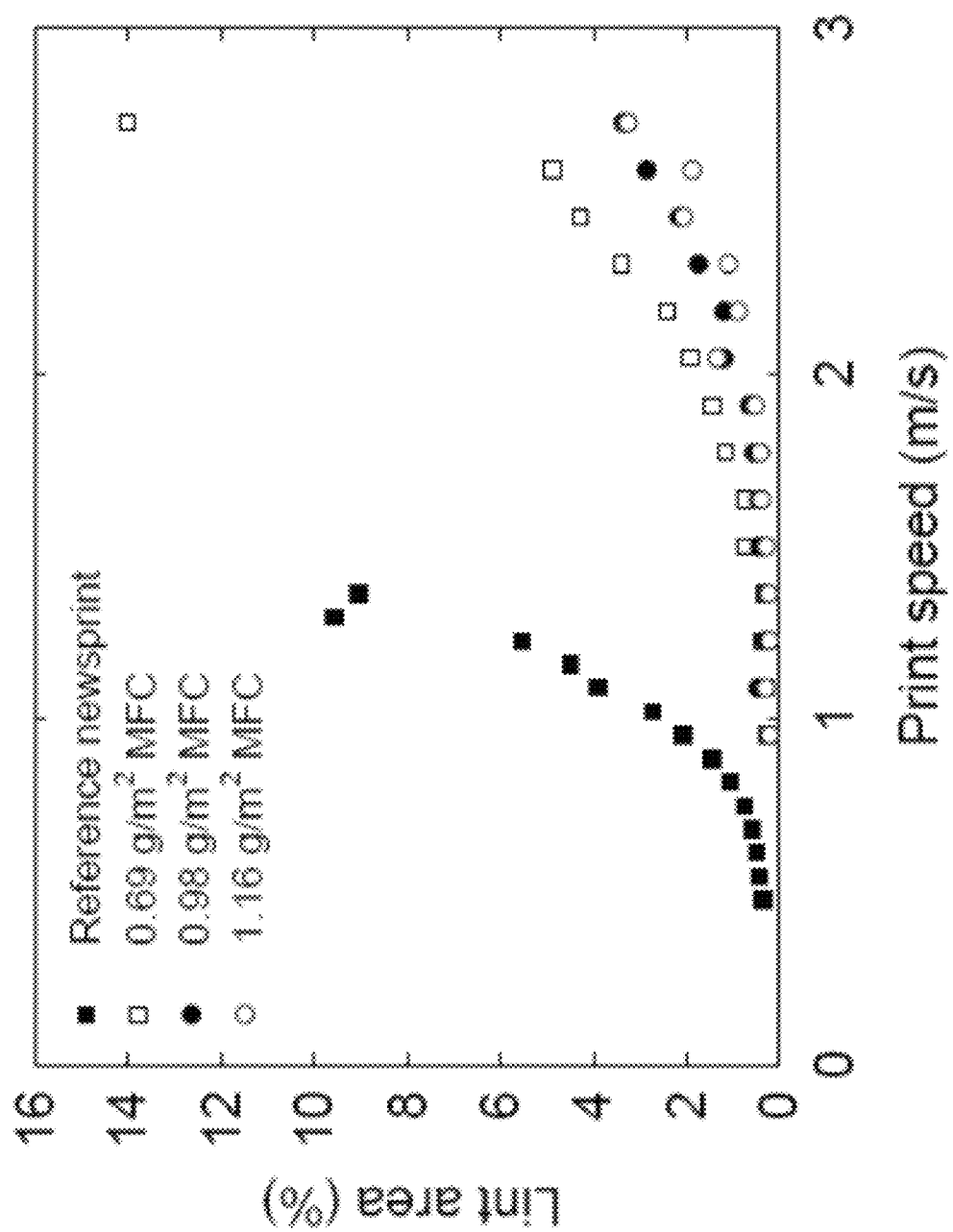
FIG. 10 shows the linting tendency of commercial newsprint with different levels of MFC coatings.

The Formette Dynamique laboratory paper sheets used in the previous part of the report, are characterized as having superior formation characteristics and in one series of experiments, commercial newsprint was also coated with MFC for comparison. The results are shown in FIG. 10. MFC-coatings alleviate the linting propensity for commercial newsprint sheets just as for the laboratory sheets.

The oil absorption was also investigated. All these experiments demonstrate the efficiency of MFC to reinforce the surface characteristics of a commercial newsprint sheet.

Fibre Rising Tendency of Commercial Newsprint Using MFC Surface Treatments

Figure 5:
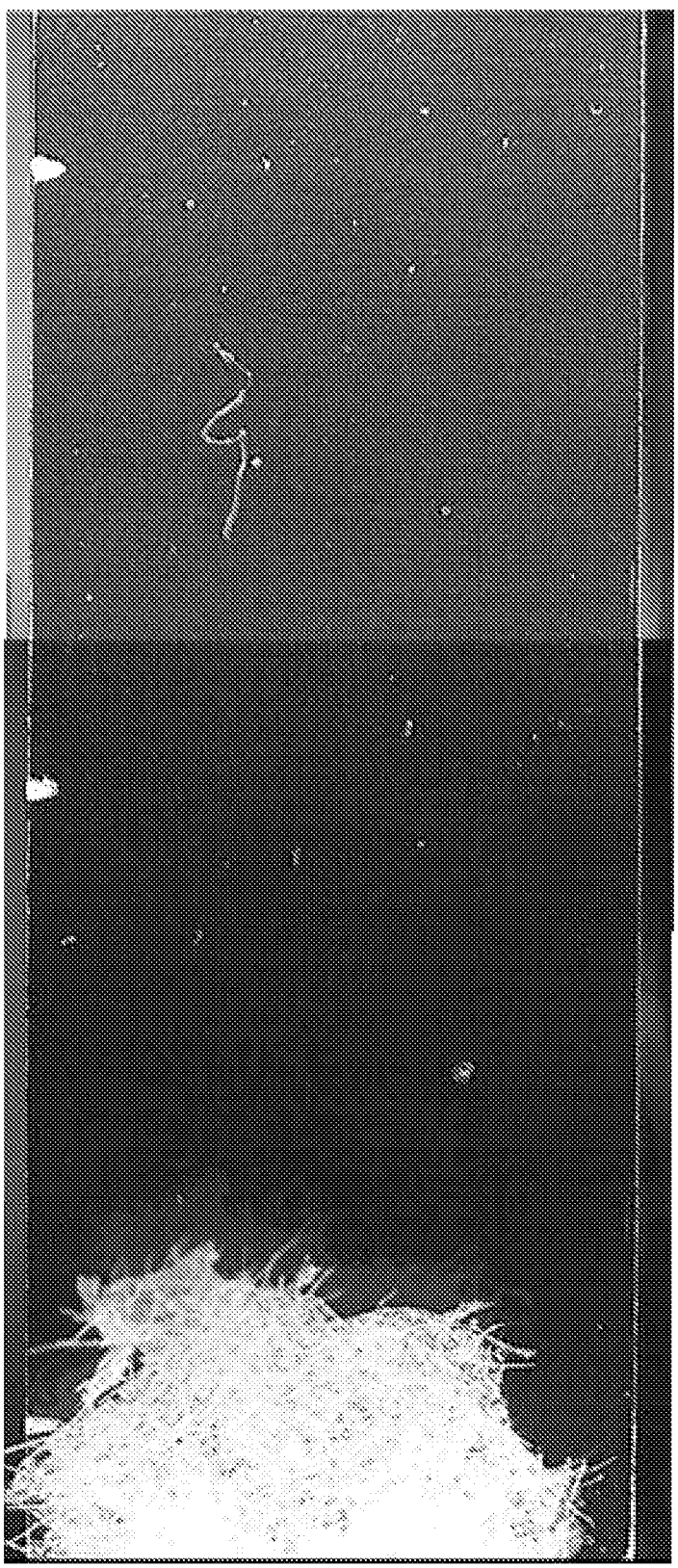
FIG. 5 shows images on the print disc at delaminating critical print speed=4.64 m/s, whereby the reference sheets were coated with MFC at 2.1 g/m2.
Figure 11:
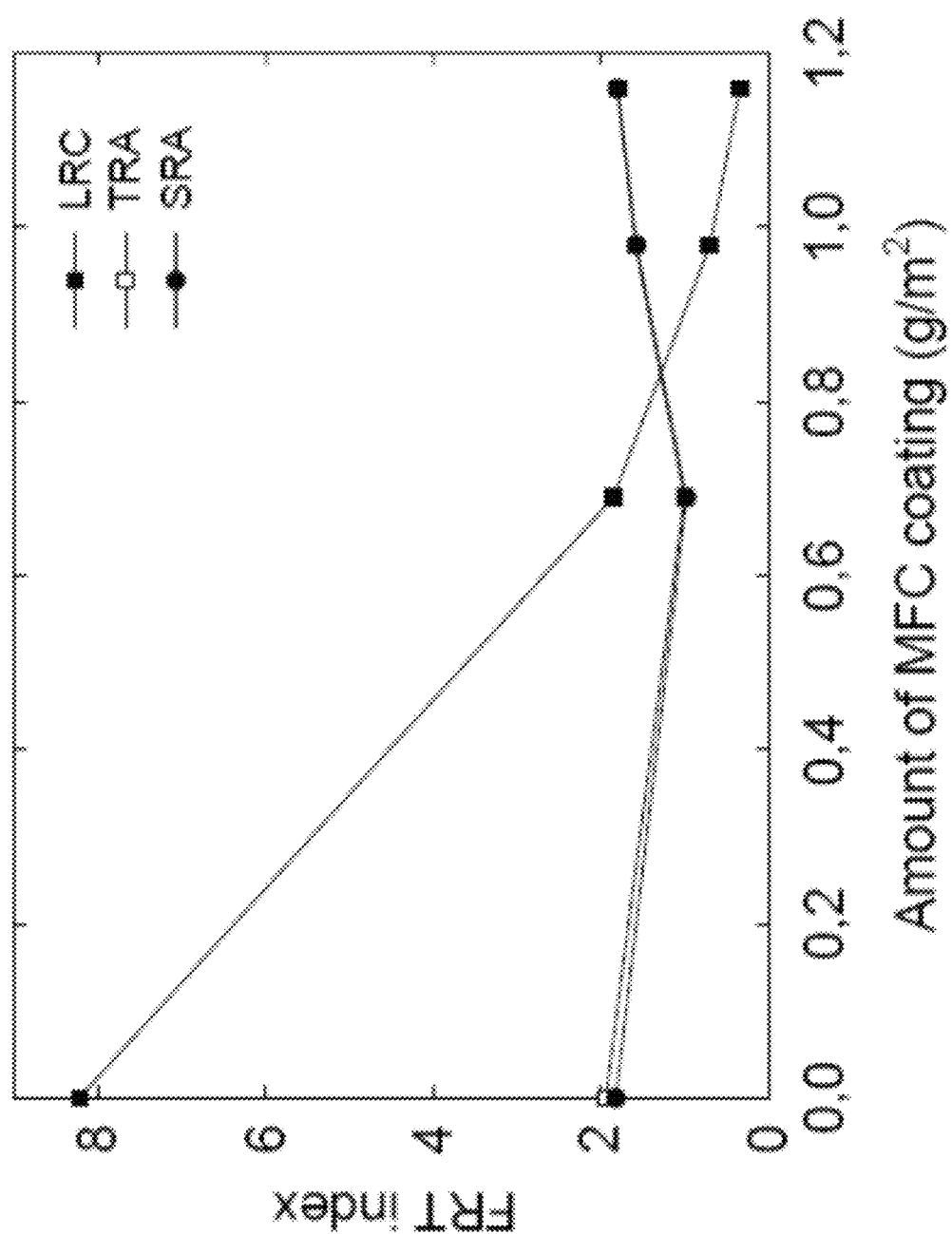
FIG. 11 shows the fibre rising tendency (FRT) results of commercial newsprint with different amounts of MFC surface treatment.
Figure 12:
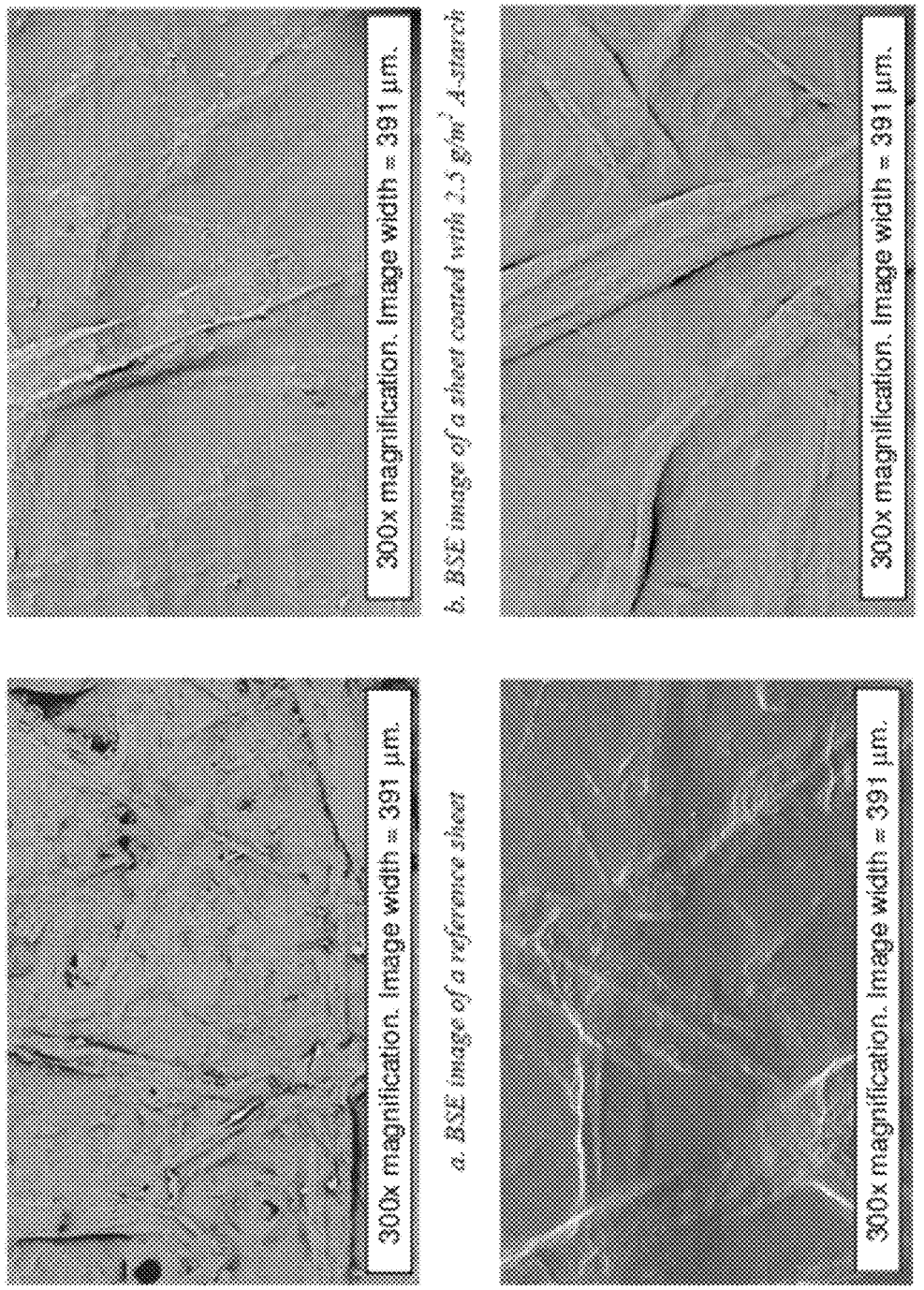
FIG. 12 shows ESEM micrographs of sheet surfaces with different coatings.
Figure 13:
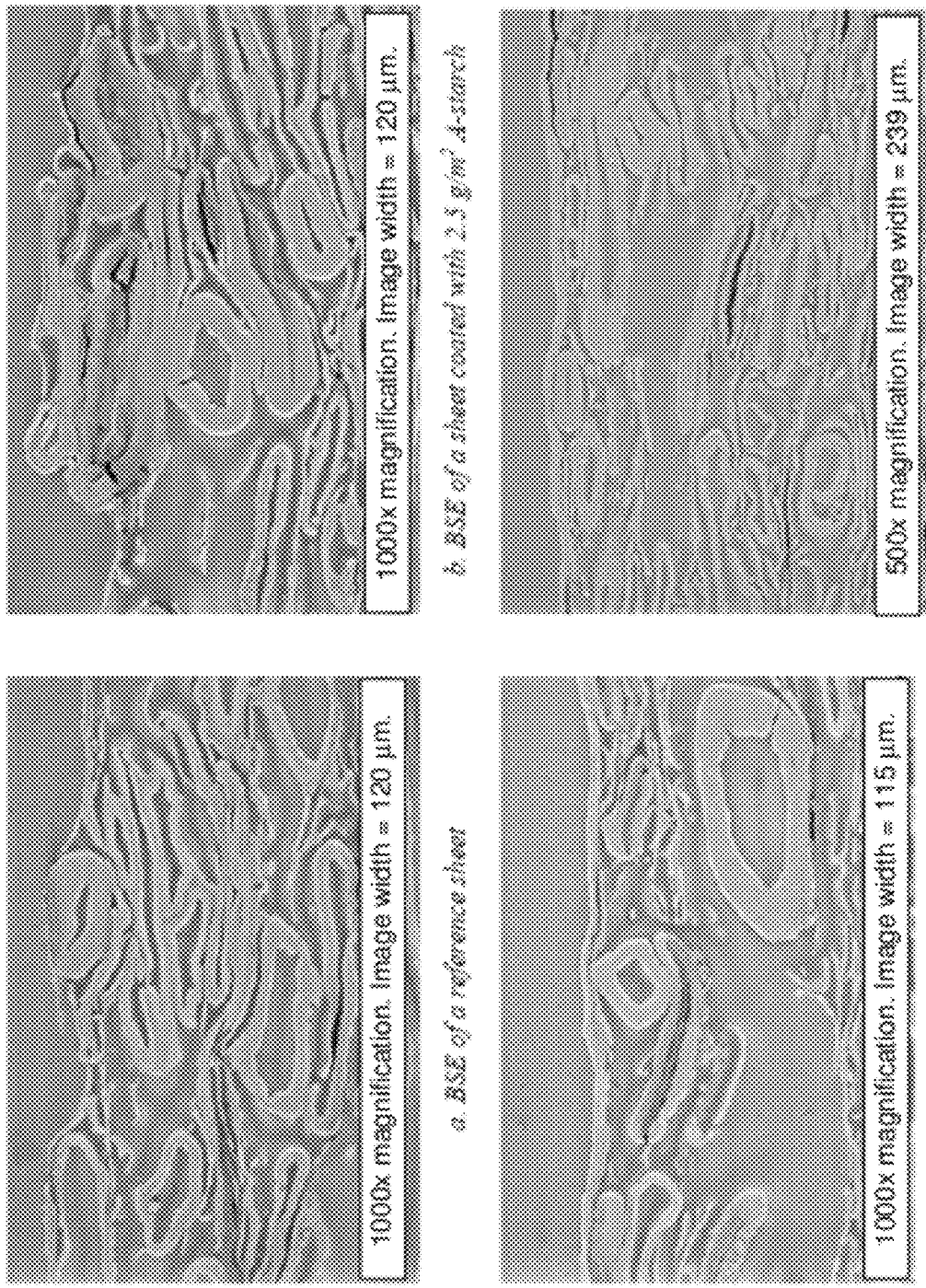
FIG. 13 shows ESEM micrographs of cross-sections of sheets with different coatings.

Fibre rising is defined as the amount and the size of fibres that rise from the paper surface when the sheet is wetted, dried and then transported over a thin roller. The commercial newsprint was surface treated with MFC and the results of FRT are shown in the following FIG. 11. FIG. 11 shows that the long fibre rising content (LRC) was decreased after the MFC surface treatment. However, the short fibre rising area (SRA) and total fibre rising area (TRA) were decreased firstly but increased when the amount of coating MFC exceeded a certain point ESEM Analysis Examples of ESEM images of starch, MFC and MFC/starch coated sheets illustrate an appearance of both sheet surfaces (FIGS. 16*a-d*) and cross-sections (FIGS. 17*a-d*). As can be seen on the reference sheet before coating (FIG. 12a) the surface is fairly rough. The coating results in a smoother surface (FIGS. 16b-d). The MFC coating results a smoother surface than the A-starch. This probably is a result of a better film forming for the MFC. This difference can also be seen in cross section images if FIG. 13b (A-starch) is compared to FIG. 13c (MFC). The MFC seems to form a relatively thick film that lays on top of the sheet surface while the A-starch forms a thinner film which also penetrates into the sheet in a different way. As was disclosed above, the weakness of the MFC film is that it seems to be less anchored to the sheet which causes delamination between the MFC layer and the sheet (see FIG. 5). The weakness with the A-starch is instead that it is not as effective in decreasing the linting. This might be due to the poorer film forming by the A-starch seen in FIG. 13b. By combining A-starch and MFC it is still possible to form a film on top of the sheet (see FIG. 13d). This film is probably mainly composed of MFC. The A-starch, can instead penetrate into the sheet in a better way. Based on the linting results shown above, one could speculate that a combination of MFC and A-starch is beneficial since it offers a possibility to both coat the sheet with a film that holds the linting particles in place as well as partially anchoring the particles internally in the sheet as well as anchoring the MFC film to the sheet.

Advantages of the Invention

The linting tendency of newspaper can be alleviated via surface sizing treatments with MFC, starch or a mixture of the two additives. Compared with merely internal treatment with C-starch, the surface treatment is more efficient in decreasing linting tendency. The MFC gel does not penetrate easily into the base sheet due to its high water retention capacity. Therefore, a sheet coated with MFC may delaminate at higher printing speeds than a sheet coated with A-starch or MFC+A-starch. It was found that there is a synergism in using a mixture of MFC and A-starch, which decreased the linting propensity more than the application of either MFC or A-starch. A-starch functions to reinforce the phase boundary between the MFC and the base sheet. It was also found that the long fibre rising tendency strongly decreased with MFC surface applications. Oil absorbency was found to decrease somewhat with increasing amount of coating chemicals.

The invention claimed is:

1. A composition for coating printing paper, comprising:
   15-90% by weight of microfibrillated cellulose (MFC); and
   one or more polysaccharide hydrocolloid(s).
2. The composition according to claim 1, wherein the composition comprises 15-50% by weight of MFC, with the balance comprising the one or more polysaccharide hydrocolloid(s).
3. The composition according to claim 1, wherein the composition comprises 25-50% by weight of MFC, with the balance comprising the one or more polysaccharide hydrocolloid(s).
4. The composition according to claim 1, wherein the composition comprises 15-25% by weight of MFC, with the balance comprising the one or more polysaccharide hydrocolloid(s).
5. The composition according to claim 1, wherein the one or more polysaccharide hydrocolloid(s) is starch.
6. The composition according to claim 5, wherein the starch is selected from the group consisting of: native starch, anionic starch, cationic starch, peroxidized starch, etherified starch, esterified starch, oxidized starch, hydrolyzed starch, dextrinized starch, hydroxyethylated starch, and acetylated starch.
7. The composition according to claim 1, wherein the one or more polysaccharide hydrocolloid is selected from the group consisting of: locust bean gum, karaya gum, xanthan gum, gum arabic, gum ghatti, pectin, targacanth, alginates, cellulose gums, guar gum, agar gum, carrageenan and tamarind gum.
8. Paper coated with the composition according to claim 1.
9. Coated paper, comprising:
   (a) a first layer of one or more polysaccharide hydrocolloid(s); and
   (b) a second layer of microfibrillated cellulose (MFC).
10. The coated paper according to claim 9, wherein the one or more polysaccharide hydrocolloid(s) in layer (a) is/are selected from the group consisting of: native starch, anionic starch, cationic starch, peroxidized starch, etherified starch, esterified starch, oxidized starch, hydrolyzed starch, dextrinozed starch, hydroxyethylated starch, and acetylated starch.
11. The coated paper according to claim 9, wherein the polysaccharide hydrocolloid is selected from the group consisting of: locus bean gum, karaya gum, xanthan gum, gum Arabic, gum ghatti, pectin, targacanth, alginates, cellulose gums, guar gum, agar gum, carrageenan and tamarind gum.
12. The coated paper according to claim 9, wherein the MFC in (b) is present in an amount of 0.1-60 $g/m^2$ of a sheet of said paper.
13. The coated paper according to claim 9, wherein the MFC in (b) is present in an amount of 0.5-40 $g/m^2$ of a sheet of said paper.
14. The coated paper according to claim 9, wherein the MFC in (b) is present in an amount of 1-30 $g/m^2$ of a sheet of said paper.
15. The coated paper according to claim 9, wherein the MFC in (b) is present in an amount of 3-20 $g/m^2$ of a sheet of said paper.
16. A method of coating a sheet of paper, comprising:
    applying the composition according to claim 1 to said sheet of paper to provide a barrier-on said sheet of paper.
17. Method of using A method of preparing the coated paper according to claim 9, comprising:
    applying said first layer and said second layer to paper to form a barrier.
18. A method for reducing linting and/or dusting of a paper, comprising coating said paper with the composition according to claim 1.

* * * * *